United States Patent Office 3,634,252

Patented Jan. 11, 1972

3,634,252

CHROMIUM DIOXIDE RECORDING COMPOSITIONS STABILIZED WITH LONG-CHAIN AMMONIUM SALTS

Boynton Graham, Wilmington, Del., assignor to E. I. du Pont de Nemours and Company, Wilmington, Del.

No Drawing. Filed June 22, 1970, Ser. No. 48,484
Int. Cl. H01f *1/26*
U.S. Cl. 252—62.54 9 Claims

ABSTRACT OF THE DISCLOSURE

Ferromagnetic chromium dioxide particles are admixed with stabilizing amounts of ammonium salts having at least one saturated aliphatic chain of at least eight carbon atoms and incorporated with a polymeric binder. The salts retard loss of residual intrinsic flux density. Magnetic recording members, e.g., tapes, discs, and cylinders, have a layer of the compositions.

CROSS-REFERENCES TO RELATED APPLICATIONS

Assignee's copending application, "Magnetic Recording Elements Containing Stabilized Chromium Dioxide, a Polyurethane Binder, and an Isocyanate Hardening Agent," in the name of Ingersoll, filed July 10, 1969, U.S. Ser. No. 840,845, discloses ferromagnetic chromium dioxide compositions containing long-chain ammonium salts as claimed in the present application.

BACKGROUND OF THE INVENTION

Field of the invention

This invention relates to magnetic recording members, e.g., magnetic tapes, and particularly to recording members containing ferromagnetic chromium dioxide as the magnetic material and to compositions from which the members or elements are made.

Description of the prior art

The preparation of ferromagnetic chromium dioxide and the use of this material to make magnetic recording members has been described in a number of patents, among which may be mentioned U.S. Pats. 2,885,365; 2,923,683; 2,923,684; 2,923,685; 2,956,955; 3,080,319; 3,117,093; and 3,278,263. Chromium dioxide prepared as described in these patents has excellent ferromagnetic properties. Magnetic recording members in which anisotropic chromium dioxide particles are highly oriented are especially suitable for storage of information.

The usefulness of any information storage system depends of course, on its reliability, that is, on the certainty that all of the information stored in the system can be retrieved on demand, even after long periods of storage. Therefore, in a magnetic storage system, it is required that the magnetic characteristics of the recording member remain essentially unchanged over a protracted time under conventional storage conditions.

Ferromagnetic chromium dioxide in the form of dry powder is stable, can be stored for many years with no detectable change, and is unaffected by prolonged heating in dry air at temperatures below 300° C. However, it reacts slowly in the presence of water with a number of different types of organic compounds to form nonmagnetic materials. The result is that some of its desirable properties may be diminished with age when it is stored in moist conditions such as are frequently present, for example, in magnetic tapes and other magnetic recording members that contain organic materials in their binder systems.

For the highly desirable ferromagnetic properties of chromium dioxide to be used to full advantage in magnetic information storage systems having a high degree of long-term reliability, there is an apparent need for stabilizers that will permit the preparation of magnetic recording members that will not undergo loss of magnetic characteristics even when stored for long periods of time under extreme conditions of temperature and humidity.

SUMMARY OF THE INVENTION

The ferromagnetic composition and magnetic recording member of the invention comprise:

(a) fine ferromagnetic chromium dioxide particles,
(b) a macromolecular organic polymer binder, and
(c) a stabilizing amount of an ammonium salt, having at least one saturated aliphatic chain of at least eight carbon atoms, preferably free of aliphatic unsaturation.

The aliphatic chain may be part of either the anion or cation. The ammonium salts useful for this invention correspond to the general formula:

$$\begin{array}{c} R_1 \\ | \\ R_2-\overset{}{N}^{\oplus}-R_4\ A^{\ominus} \\ | \\ R_3 \end{array}$$

wherein $R_1$, $R_2$, $R_3$ and $R_4$ are hydrogen or organic radicals, and at least one of the R's or the anion $A^{\ominus}$ contains a saturated aliphatic radical of at least eight carbon atoms. For convenience, the saturated aliphatic radicals of at least eight carbon atoms may be referred to hereinafter as "long-chain radicals," and the ammonium salts containing them may be referred to as "long-chain ammonium salts."

The invention also relates to a process for making the composition by admixing ingredients (a) and (c) and a solvent for ingredient (c) and then admixing the binder.

The magnetic recording compositions of this invention, as compared with prior art compositions, have significantly enhanced stability of their ferromagnetic properties upon aging in hot, moist conditions; and are useful for various purposes, e.g., as magnetic recording members, e.g., discs, cylinders, audio, video, instrumentation, and computer tapes, for control equipment and magnetic cores.

DESCRIPTION OF THE PREFERRED EMBODIMENTS

In making magnetic recording members according to this invention, any preformed ferromagnetic chromium dioxide may be used, but it is desirable to use a form having high coercivity and high remanent magnetization. Preferably, the chromium dioxide is in single-crystal acicular form that possesses magnetocrystalline anisotropy with a unique axis of easy magnetization which coincides more or less with the acicular axis. The preparation of suitable forms of ferromagnetic chromium dioxide is described in U.S. Pats. 2,885,365; 2,923,683; 2,923,684; 2,956,955; 3,034,988; and 3,278,263. Also suitable are chromium dioxides prepared as described in these patents then subjected to after-treatments such as the upgrading described in the assignee's copending application of Bottjer and Cox, S.N. 705,029, filed Feb. 13, 1968, U.S. Pat. 3,529,930, Sept. 22, 1970 and the stabilizing treatment described in Bottjer and Ingersoll, U.S. Pat. 3,512,-930, May 19, 1970. Recording members can contain 1%–98% and preferably 65%–75% by weight of fine, acicular ferromagnetic chromium dioxide particles having the sizes and physical properties defined in the above-listed patents.

The preferred stabilized ferromagnetic chromium oxides have an intrinsic coercive force, $H_{ci}$, of 200 oersteds or greater; a saturation magnetization, $\sigma_s$, of at least 70 emu/g.; and a remanent magnetization, $\sigma_r$, of at least 30 emu/g. Intrinsic coercive force, $H_{ci}$, is defined in Special Technical Publication No. 85 of the American Society for Testing Materials entitled "Symposium on Magnetic Testing" (1948), pp. 191–198. The values given in the examples hereinafter were determined on a DC ballistic-type apparatus which is a modified form of the apparatus described by Davis and Hartenheim in "Review of Scientific Instruments," 7, 147 (1936). Saturation per gram, $\sigma_s$, and remanence per gram, $\sigma_r$, are defined on pp. 5–8 of Bozorth's "Ferromagnetism," D. Van Nostrand Co., New York (1951). The values given hereinafter for these properties were determined in a field of 4,400 oersteds on apparatus similar to that described by T. R. Bardell on pp. 226–228 of "Magnetic Materials in the Electrical Industry," Philosophical Library, New York (1955).

As the organic polymeric binder, there may be employed, singly or in combination, any of the commercially available polymers commonly used in preparing magnetic tapes and other magnetic recording members. Alternatively, the binder can be a polymer prepared by addition polymerization or condensation polymerization from available monomers. Representative macromolecular film forming, organic polymer binders include polyesters, polyethers, polyamides, polyurethanes, vinyl polymers (including mixtures of polymers or copolymers of two of more of the vinyl or acrylic monomers, as well as polyacrylic or polymethacrylic acids or esters thereof), polybutadiene, polycarbonates, cellulose esters, mixtures of the foregoing polymers, or copolymers of two or more of the monomers of the foregoing polymers. Those skilled in the art can readily select from the large number of available polymers those that will give the desired combination of such properties as strength, elasticity, surface uniformity, smoothness, and the like. One preferred material is a soluble preformed polyester-polyurethane elastomer resin based on diphenylmethane diisocyanate, adipic acid, and an alkanediol having 2–4 carbon atoms. If desired, a binder of this kind may be hardened with such agents as polyfunctional isocyanates, e.g., toluene diisocyanate/trimethylol propane (5/2), 4,4′-methylene-bis-(cyclohexyl-isocyanate), and the like. Other preferred binders are the commercially available copolymers of vinylidene chloride with acrylonitrile, of butadiene with acrylonitrile and of vinyl chloride with vinyl acetate; and these may also be usefully combined with the polyester-polyurethane elastomer resins previously described. The binder will preferably comprise 25% to 35% by weight of the dry composition. The binders preferably have molecular weights greater than 20,000, preferably greater than 100,000.

The composition may include small quantities of other conventional ingredients, e.g., surface active agents, reticular carbon, lubricants, etc., including those disclosed in U.S. Pats. 2,418,479; 2,654,681; 2,804,401; 3,009,847; 3,274,111; and 3,320,090.

With the ferromagnetic chromium dioxide of such compositions, there is present, according to this invention, a stabilizing amount, i.e., from less than 1% to 10% or more by weight of the total dry weight of the chromium dioxide in the composition, of an ammonium salt of the general formula:

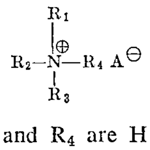

wherein $R_1$, $R_2$, $R_3$, and $R_4$ are H or organic radicals and at least one of the R's or the salt-forming anion $A^{\ominus}$ contains a saturated chain of at least eight carbon atoms.

Among the suitable compounds are ammonium salts of long-chain alkyl carboxylic acids or perfluorocarboxylic acids having a chain length of at least eight carbon atoms, e.g., ammonium stearate and ammonium ω-H-perfluorooctanoate. Alkyl ammonium salts are also useful, i.e., salts of primary, secondary or tertiary amines wherein at least one of the organic radicals attached to the nitrogen atom contains a saturated aliphatic chain of at least eight carbon atoms. Representative of such salts are lauryl ammonium acetate, lauryl ammonium chloride, cetyl dimethyl benzyl ammonium chloride, lauryl trimethyl ammonium chloride, and stearyl trimethyl ammonium chloride. The quaternary salts are especially preferred, and of this class a particularly preferred group are those ammonium salts in which the nitrogen atom is part of an aromatic heterocyclic ring having a saturated aliphatic chain at least eight carbon atoms in length attached to the ring either at the nitrogen atom or at one of the carbon atoms. Suitable compounds of this type include alkyl pyridinium or quinolinium salts having a long chain alkyl group of at least eight carbon atoms attached to the pyridine or quinoline members through the nitrogen or one of the carbon atoms. Useful compounds of this type are lauryl pyridinium chloride, cetyl pyridinium chloride, alkyl($C_{12}$–$C_{18}$) methyl isoquinolinium chlorides, nonylnaphthylmethyl pyridinium chloride, lauryl picolinium p-toluene sulfonate, stearamidomethyl pyridinium chloride, pyridinium perfluoro-octanoate, and stearyl imidazolinium chloride. Still another particularly preferred group of quaternary ammonium salts are the long-chain-substituted betaines, and especially the sulfobetaines, provided that the long-chain substituent is saturated. Typical salts of this group or C-cetyl betaine, dimethylstearylamine sulfobetaine, and hydroxylated or chlorinated lecithin. Suitable C- and N-betaines with long chain radicals are listed in Downing & Johnson, U.S. Pat. 2,129,264, Sept. 6, 1938.

It has been found that many of the long-chain ammonium salts useful as stabilizers in the present invention can serve effectively also as dispersing agents for the chromium dioxide in the binder systems. When these compounds are used, the dispersing agents which would otherwise commonly be employed can be omitted from the compositions. This is an additional advantage of the present invention, since some of the conventional dispersing agents have been shown to accelerate the degradation of magnetic properties of chromium dioxide in the presence of moisture.

The weights, parts and percentages of the various components are discussed in terms of the final dry magnetic composition, i.e., binder, chromium dioxide, stabilizer, lubricant, plus other ingredients, but the compositions are initially made up from solutions of the various components, where it is not feasible to use a given component, e.g., the polymer binder, in its undissolved form. The solvent content of a given composition is, of course, evaporated in the course of putting the composition in the form of a useful magnetic recording member. The choice of solvent will be governed by the solubility characteristics of the binder resin(s), stabilizer, lubricant, and other materials selected for the composition. Representative solvents for the polymer binders and long-chain ammonium salt stabilizers are tetrahydrofuran, acetone, cyclohexanone, and methyl ethyl and methyl isobutyl ketones. Mixtures of two or more such solvents can be used.

In preparing magnetic recording compositions according to this invention, the procedures described below may be employed. In a typical procedure, the preformed chromium dioxide, the long-chain ammonium salt stabilizer and a quantity of solvent are placed in a container together with an amount of Ottawa sand equal to 4–6 times the weight of the chromium dioxide. The container is closed and the ingredients are slurry-milled, for example, with the aid of a paint conditioner or shaker oscillating at about 700–1000 cycles per minute. The milling may also be accomplished conveniently by the use of one or more stirring discs, e.g., two discs in tandem, rotating at peripheral speeds of 1000–2000 feet per minute. Conventional ball-milling and pebble-milling can also be used. There is then added a solution of the polymeric binder component(s) in an amount sufficient to give the desired proportion of binder in the final dry composition. After further milling or shaking, there may be additions of such other components as lubricants, hardening agents, and the like and it will frequently be desirable that the additions be made as solutions of these various ingredients. When sufficient final mixing and milling have been carried out, the dispersion may be filtered, deaerated, and adjusted to desired final viscosity by addition of solvent.

The dispersions prepared in this way may be cast by conventional techniques to form self-supporting films which may serve as integral magnetic recording members. Alternatively, they may be coated, by means of a doctor knife adjusted to give a coating of the desired thickness, on any suitable base material to form supported magnetic recording members. A particularly useful coating technique is the gravure-coating procedure described in Long, U.S. Pat. 3,468,700 and carried out with apparatus such as that described in Long, U.S. Pat. 3,392,701. Among the base materials that may be used are nonmagnetic metal sheets, plates, discs, drums, and the like, and previously prepared films, sheets, or tapes made from any of a number of organic polymeric materials having suitable characteristics of strength, dimensional stability, surface friction, and the like, all as well understood by those skilled in this art, e.g., films of cellulose acetate or of polyethylene terephthalate. In either case, i.e., supported or nonsupported, the films or coatings are passed while the coating is still fluid between opposing magnets having an orienting field strength sufficient to align the magnetic particles in parallel fashion. The films or coatings containing the oriented chromium dioxide particles are then allowed to dry at room or elevated temperature, and, when they contain cross-linking agents, to cure at temperatures and for periods of time sufficient to produce cross-linking of the polymers in the compositions. The resulting coatings or films may then be aged under various conditions for testing their stability. When they are to be tested for magnetic properties, they may first be calendered at elevated temperature and pressure, the exact temperature and pressure varying with the particular composition of the coating and the base (if any). If the members are to be aged before testing, they will, of course, be stored for the desired length of time in an environment where the desired conditions of temperature and humidity are maintained.

The invention will be further explained by the following examples, which are intended to be illustrative and not limiting. The chromium dioxide used in these examples was prepared according to Cox U.S. Pat. 3,278,263, Oct. 11, 1966, and was further made ready by mechanical milling to break up agglomerates and insure uniform fine particle size. The more important magnetic characteristics are given for each sample of chromium dioxide employed.

The stability of the magnetic characteristics of a magnetic recording member can be determined by measurement of residual intrinsic flux density (or remanent flux), $\phi r$, of a 0.5-inch-wide sample of the member when fresh and again after aging. This property is measured on a DC ballistic-type magnetometer that is a modified form of the apparatus described by Davis and Hartenheim in "Review of Scientific Instruments," 7, 147 (1936). Since the rate of degradation of magnetic properties is generally slow at normal room conditions, it is usually desirable to accelerate the test by aging the members at elevated temperature and humidity. Experience has shown that one day of aging at 65° C., 50% RH produces degradation equivalent to that found after about one year of aging under normal storage conditions. In the examples that follow, the stability of the magnetic characteristics of the compositions is reported either (a) directly as the change in residual intrinsic flux density ($\Delta\phi r$ expressed as a percent of the $\phi r$ of the unaged sample) after the indicated period of aging at the indicated conditions, or (b) as a $t_{10}$ value, that is, the time in days required for a loss of 10% of the initial $\phi r$ at the indicated aging conditions.

EXAMPLE I

This example illustrates a magnetic recording member of the invention in the form of a magnetic tape. The magnetic composition contained a long-chain ammonium salt as a stabilizer.

In a porcelain jar with a capacity of about 1500 ml. there were placed (a) 175 ml. of tetrahydrofuran; (b) about 220 ml. of one-half-inch-diameter ceramic balls; (c) 94.0 g. of chromium dioxide having an intrinsic coercive force ($H_{ci}$) of 336 oersteds, a saturation ($\sigma_s$) of 78.0 emu/g., and remanence ($\sigma_r$) of 35.2 emu/g.; and (d) 4.7 g. of a commercially available long-chain ammonium salt, diethyl cyclohexyl ammonium lauryl sulfate. The jar was capped and the ingredients were ball-milled for three days at room temperature. To the contents of the jar were then added (e) 11.3 g. dry basis (89.7 g. of a 12.6% by weight solution in tetrahydrofuran) of a commercially available polyester-polyurethane resin from 1,4-butanediol, adipic acid, and diphenylmethane diisocyanate; (f) 20.2 g. dry basis (67.2 g. of a 30% by weight solution in methyl isobutyl ketone) of a commercially available vinylidene chloride/acrylonitrile (80/20) copolymer; (g) 0.2 g. silicone oil; (h) 1.0 ml. octanol; and (i) 33.6 ml. tetrahydrofuran. The jar was again capped and the ingredients were ball-milled for two days at room temperature. The mixture was then filtered through a cloth pad supported on a metal screen having a 2-micron filter rating. The filtered mixture was supersonically vibrated (Branson Sonifier at 110 watts) for ten minutes.

The dispersion thus prepared was spread by means of a doctor knife set at a clearance of 0.003 inch on a 0.001-inch-thick commercial polyethylene terephthalate film base. While the coating thus formed was still fluid, the coated film was passed between opposing magnets having an orienting magnetic field strength of 900 gauss to align the chromium dioxide particles. The oriented layer was then dried overnight at room temperature. The dry layer was calendered between a cotton-filled roll and a polished chrome-plated steel roll having its surface at a temperature of about 105° C. at a pressure of 1000–1200 pounds per linear inch, with the coated side of the film in contact with the polished steel roll. The composition of the dry magnetic coating, exclusive of the polyethylene terephthalate supporting film, was approximately 71% by weight chromium dioxide and 29% by weight total binder. The long-chain ammonium salt was incorporated to the extent of 5% by weight on the weight of the chromium dioxide. The coating had the magnetic properties characteristic of coatings containing ferromagnetic chromium dioxide of the patents listed above. Residual intrinsic flux density was determined initially and after aging for five months at room temperature and ambient relative humidity, and the loss in intrinsic flux density ($\Delta\phi r$) after aging these conditions was found to be approximately 1.2%.

For comparative purpose, there was prepared Item A, a magnetic tape representative of the prior art. In place of the long-chain ammonium salt stabilizer of Example I, the Item A composition contained a commercially available soya lecithin commonly used as a dispersant in the manufacture of iron oxide magnetic tapes. Procedures like those of Example I were followed to make a magnetic composition containing, on a dry basis:

(a) 94 g. of the chromium dioxide of Example I,
(b) 11.14 g. of the polyester-polyurethane resin of Example I, (c) 19.95 g. of the vinylidene chloride/acrylonitrile copolymer of Example I,
(d) 4.7 g. of soya lecithin,
(e) 0.47 g. of silicone, and
(f) 1.1 ml. octanol.

This composition was made into a magnetic recording member according to Example I. Loss of intrinsic residual flux density ($\Delta^{\phi}r$) after five months of aging at room temperature and ambient relative humidity was approximately 6.5%, as compared with $\Delta^{\phi}r=-1.2\%$ for Example I, thus illustrating the effectiveness of the long-chain ammonium salt in retarding degradation of the magnetic properties of the recording member.

EXAMPLES II–V

Examples II–V, representative of this invention, and comparison Items B and C, not representative of this invention, were all made according to the general procedures of Example I except that the magnetic compositions were sand-milled rather than ball-milled. The ferromagnetic chromium dioxide used for these compositions had an intrinsic coercive force ($H_{ci}$) of 382 oersteds, a saturation of ($\sigma_s$) of 82.1 emu/g., and a remanence ($\sigma_r$) of 37.4 emu/g. On a dry weight basis, the compositions contained approximately 71% $CrO_2$ and 29% binder. The binder resin was a mixture of equal parts by dry weight of the vinylidene chloride/acrylonitrile copolymer of Example I and a commercially available polyester-polyurethane from diphenylmethane diisocyanate, adipic acid and a mixture of alkanediols having 2–4 carbon atoms. Item B contained no additive. Item C contained 4% by weight (on the weight of the $CrO_2$) of a commercially available dispersing agent, octylphenyl polyglycol ether. Examples II–V contained 4% by weight (on the weight of the $CrO_2$) of the long-chain ammonium salt stabilizers identified in Table 1, which also shows the results of stability tests in terms of $t_{10}$, the time in days to arrive at $\Delta^{\phi}r=-10\%$, for aging tests carried out at 65° C. at relative humidities of 50% and 98%.

TABLE 1

| | Additive | $t_{10}$ at 65° C. 50% RH | $t_{10}$ at 65° C. 98% RH |
|---|---|---|---|
| Item B | None | | 1.4 |
| Item C | Octylphenyl polyglycol ether | 1.2 | 0.9 |
| Example: | | | |
| II | Lauryl ammonium hydrochloride | 2.9 | ---------- |
| III | Lauryl ammonium acetate | 3.0 | ---------- |
| IV | Ammonium ω-H-perfluoro octanoate | 3.7 | ---------- |
| V | Cetyl dimethyl benzyl ammonium chloride | | 4.1 |

The data in Table 1 clearly show the advantage of the stabilized compositions of this invention. Particularly noteworthy is the effectiveness of the preferred long-chain quaternary ammonium salt in the rigorously degrading test at 98% RH.

EXAMPLES VI–VII

These examples and comparative Item D employed the ferromagnetic chromium dioxide of Example II and were made by sand-milling procedures otherwise like those of Example I. The dry compositions contained approximately 70% $CrO_2$ and 30% binder. For Example VI and Item D, the binder resin consisted of the polyurethane of Example II, the vinyl copolymer of Examples I and II, and toluene diisocyanate/trimethylolpropane (5/2) in a ratio of 41/41/7 parts by dry weight, respectively. The binder resin for Example VII consisted of equal parts by dry weight of the vinyl copolymer of Examples I and II and an acrylic polymer made by procedures familiar to those skilled in the polymer art, viz, 2-ethylhexyl acrylate/acrylonitrile/acrylic acid (80/20/20). In all cases, an additive was employed to the extent of 4% by weight on the weight of the $CrO_2$, as identified in Table 2, which also shows results of stability tests.

TABLE 2

| | Additive | $t_{10}$ at 65° C. 50% RH | $t_{10}$ at 65° C. 98% RH |
|---|---|---|---|
| Item D | Soya lecithin (prior art) | 2.2 | 1.2 |
| Example: | | | |
| VI | Lauryl pyridinium chloride | 4.2 | ---------- |
| VII | Diethyl cyclohexyl ammonium lauryl sulfate. | ------------ | 4.0 |

EXAMPLE VIII

Example VIII and comparison Item E were made by the sand-milling procedures previously described, and employed a chromium dioxide having $H_{ci}=371$ oersteds, $\sigma_s=8.46$ emu/g., and $\sigma_r=38.3$ emu/g. Both samples had an approximate dry composition of 70% $CrO_2$, 30% binder. Item E was made with the binder of Example II, i.e., equal parts of vinyl polymer and polyurethane, and contained 4% (on the weight of the $CrO_2$) of a prior art dispersing agent, sodium octyl sulfosuccinate. For Example VIII, the sole resin component of the binder was the same vinyl polymer, i.e., vinylidene chloride/acrylonitrile (80/20), and the additive was 4% (on the weight of the $CrO_2$) of the long-chain ammonium salt of Example I, illustrating the effectiveness of this stabilizer with a different chromium dioxide in a different binder. When samples were aged at 65° C., 98% RH, Item E had a $t_{10}$ of 2.2 days, but Example VIII, stabilized according to this invention, had a $t_{10}$ of approximately 4.0 days.

EXAMPLE IX

This example shows the effectiveness of the stabilizer of Examples I and VIII with a still different chromium dioxide and binder. The chromium dioxide employed had $H_{ci}=369$ oersteds, $\sigma_s=83.4$ emu/g., $\sigma_r=38.2$ emu/g. The ball-milling procedures of Example I were followed, except that the solvent used was dimethyl acetamide. The stabilizing additive was the long-chain ammonium salt of Example I, to the extent of 4% by weight on the weight of the $CrO_2$. To serve as binder, there was added a 10% by weight solution in dimethyl acetamide of the polyamide-acid reaction product (inherent viscosity= 2.95 for 0.5% solution in dimethyl acetamide at 30° C.) of 4,4′-diaminodiphenyl ether and pyromellitic dianhydride, prepared as described in U.S. Pat. 3,179,634. The dispersion thus made was cast, by means of a doctor knife set at 0.003 inch, on a 0.002-inch thick polyimide film which had previously been prepared from the same polyamide-acid and converted to a polyimide, likewise as described in U.S. Pat. 3,179,634. After magnetic orientation as in Example I, the coating was dried for 15 minutes at 100° C., then immersed for 24 hours in a mixture of equal parts by volume of pyridine and acetic anhydride to convert the polyamide-acid to a polyimide, and finally air-dried at room temperature for 24 hours. When aged at 65° C., 50% RH, the magnetic recording element thus prepared had a $t_{10}$ of approximately 5.0 days.

EXAMPLES X–XXIX

Examples XXXIV–XXXVI and control Item H were chromium dioxide having $H_{cf}=438$ oersteds, $\sigma_s=82.6$ emu/g., and $\sigma_r=38$ emu/g., and used the binder of Example VI. All were made by the sand-milling procedures previously described, and all incorporated an additive to the extent of 4% by weight on the weight of the $CrO_2$. Item F represents a prior art composition and contained soya lecithin as the additive. Examples X–XXIX were compositions of this invention and contained the long-chain ammonium salt stabilizers identified in Table 3, which also shows the results of aging tests at 65° C., 50% RH.

TABLE 3

| | Additive | $t_{10}$, days, 65° C., 50% RH |
|---|---|---|
| Item F | Soya lecithin (prior art) | 3.2 |
| Example: | | |
| X | Lauryl pyridinium chloride | 5.0 |
| XI | Hydroxylated lecithin [1] | 3.7 |
| XII | Diethyl cyclohexyl ammonium lauryl sulfate. | 3.9 |
| XIII | C-cetyl betaine | 5.4 |
| XIV | C-decyl betaine | 5.5 |
| XV | Cetyl pyridinium chloride | 6.2 |
| XVI | Laurylbenzyl pyridinium chloride | ~8 |
| XVII | Nonadecylbenzyl pyridinium chloride | 8.3 |
| XVIII | N-lauroyl colaminoformyl methyl pyridinium chloride. | 4.6 |
| XIX | N-stearoyl colaminoformyl methyl pyridinium chloride. | 4.5 |
| XX | Hexylbenzyl pyridinium chloride | 7.7 |
| XXI | Nonylnaphthylmethyl pyridinium chloride | 8.9 |
| XXII | Cetyl pyridinium bromide | 5.3 |
| XXIII | Lauryl picolinium p-toluene sulfonate | 6.0 |
| XXIV | Stearamidomethyl pyridinium chloride | 6.7 |
| XXV | Lauryl trimethyl ammonium chloride | 6.7 |
| XXVI | N-alkyl($C_{12}$-$C_{18}$) methyl isoquinolinium chloride. | 6.2 |
| XXVII | N-alkyl($C_{14}$-$C_{18}$) isoquinolinium bromide | 6.0 |
| XXVIII | 2-hexylpyridinium perfluorooctanoate | 3.5 |
| XXIX | Alkyl($C_{14}$-$C_{18}$) bis-β-hydroxyethyl γ-sulfopropyl betaine. | 3.8 |

[1] Saturated conversion product of natural (unsaturated) lecithin.

EXAMPLES XXX–XXXIII

For Examples XXX–XXXIII and control Item G there was used the chromium dioxide of Example X in a binder having the dry weight composition of 76 parts of the polyurethane of Example I, three parts of toluene diisocyanate/trimethylolpropane (5/2), and one part of stearamide as a lubricant. Each sample also contained 4% by weight (on the weight of the $CrO_2$) of the additives shown in Table 4. Preparation of samples was by sandmilling and coating procedures of preceding Examples. Aging of the resulting magnetic recording members was carried out at 65° C., 50% RH.

TABLE 4

| | Additive | $t_{10}$, days |
|---|---|---|
| Item G | Soya lecithin (prior art) | 1.5 |
| Example: | | |
| XXX | Lauryl pyridinium chloride | 3.1 |
| XXXI | C-cetyl betaine | 2.0 |
| XXXII | Stearyl diethanolamine quaternary [1] | 1.8 |
| XXXIII | Stearylamine/dimethyl sulfate quaternary [2] | 2.2 |

[1] Mixture of amides and esters made from stearic acid and diethanolamine, quaternized with methyl sulfate.
[2] Made from N-2-hydroxyethyl-N,N',N'-tris-(2-hydroxypropyl)-et' ylene diamine, esterified with 2 mols of stearic acid and doubly quaternized with methyl sulfate.

Examples XXXIV–XXXVI and control Item H were made, by procedures already described, from the chromium dioxide of Example X and a binder like that of Example XXX, except that the toluene diisocyanate/trimethylolpropane (5/2) was replaced by 4,4'-methylene-bis-(cyclohexylisocyanate). As before, additives identified in Table 5 were incorporated at 4% by weight (on the weight of the $CrO_2$), and aging was conducted at 65° C., 50% RH.

TABLE 5

| | Additive | $t_{10}$, days |
|---|---|---|
| Item H | Soya lecithin (prior art) | 3.5 |
| Example: | | |
| XXXIV | Laurybenzyl pyridinium chloride | 5.6 |
| XXXV | iso-Laurylbenzyl pyridinium chloride | 6.0 |
| XXXVI | Nonadecylbenzyl pyridinium chloride | 5.3 |

EXAMPLES XXXVII–XXXVIII

These examples were made from the chromium dioxide of Example X by procedures already described. The dry weight composition of the binder was:

56 parts of the polyester-polyurethane of Example I,
24 parts of vinyl chloride/vinyl acetate (97/3) copolymer,
7 parts of 4,4'-methylene-bis-(cyclohexylisocyanate), and
1 part of stearamide lubricant.

Stabilizers were included at 4% by weight (on the weight of the $CrO_2$) and aging was done at 65° C., 50% RH. Example XXXVII contained laurylbenzyl pyridinium chloride as stabilizer and had a $t_{10}$ value of 11.8 days. Example XXXVIII contained 2-dodecylbenzyl pyridinium chloride and had a $t_{10}$ value of 12.4 days.

EXAMPLE XXXIX

This example illustrates a still different binder for the chromium dioxide of Example X and 4% lauryl pyridinium chloride as stabilizer, with stearamide as lubricant in the same amount as before. The binder resin was polyvinyl butyral and the solvent was methyl acetate. When a magnetic recording member was made up and tested by the same procedures as before, it had a $t_{10}$ value (65° C., 507 RH) of 4.3 days.

EXAMPLES XL–XLV

The chromium dioxide used for these examples had $H_{ci}$=420 oersteds, $\sigma_s$=82.7 emu/g., and $\sigma_r$=37.4 emu/g. The binder was the same as for Example XXXIV, and the procedures were those already described. Additives (4% on the weight of the $CrO_2$) are identified and the results of aging tests (65° C., 50% RH) are given in Table 6.

TABLE 6

| | Additive | $t_{10}$, days |
|---|---|---|
| Item K | Soya lecithin (prior art) | 2.7 |
| Example: | | |
| XL | Nonadecylbenzyl pyridinium p-toluene sulfonate. | 7.6 |
| XLI | Sulfobetaine of dimethyl cocoamine | 4.8 |
| XLII | Sulfobetaine of dimethyl stearylamine | 5.4 |
| XLIII | Acrylate polymer [diethylaminoethyl methacrylate/methyl methacrylate/ethyl acrylate (25/25/50)] 85% quaternized with dimethyl sulfate. | 7.0 |
| XLIV | Dimethylcyclohexylamine salt of 1,1,1,2,2,3,3,-4,4,5,5,6,6-tridecafluorododecyl phosphonic acid [$F(CF_2)_6(CH_2)_6P(O)(OH)_2$.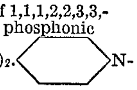N-($CH_3)_2$]. | 3.6 |
| XLV | Dimethylcyclohexylamine salt of 1,1,1,2,2,3,3,-4,4,5,5,6,6,7,7,8,8-heptadecafluoroeicosylphosphonic acid [$F(CF_2)_8(CH_2)_{12}P(O)(OH)_2$.-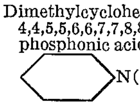$N(CH_3)_2$]: | 4.4 |

Other operable compounds, giving $t_{10}$ values (65° C., 50% RH) of the order of 10 days or more in compositions like those already illustrated, are 2-methyl benzothiazole hexadecyl bromide, 2-methyl benzothiazole lauryl iodide, and 2,4-dimethyl-4-hydroxymethyl oxazoline hexadecyl bromide.

From all of the foregoing, it will be seen that magnetic recording members containing long-chain ammonium salts as stabilizers according to this invention have significantly better retention of their magnetic properties as compared with prior art members that do not contain the stabilizers of this invention. Magnetic recording members made as described herein are of high quality and excellent stability. They are suitable for any of the uses where magnetic recording is employed, e.g., audio and television recording, instrumentation and computer applications, and various types of control equipment. The improved stability characteristic of the magnetic recording members of this invention makes them particularly useful in applications where the recording member is to be stored for long periods of time under conditions of high temperature and high humidity.

The embodiments of the invention in which an exclusive property or privilege is claimed are defined as follows:

1. A ferromagnetic composition comprising:
   (a) fine ferromagnetic chromium dioxide particles,
   (b) a macromolecular organic polymer binder, and
   (c) a stabilizing amount of an ammonium salt having at least one saturated aliphatic chain of at least 8 carbon atoms.

2. A composition according to claim 1, wherein said salt is present in an amount from about 1% to about 10% by weight of the weight on a dry basis of the chromium dioxide.

3. A composition according to claim 1, wherein the salt is an inner salt.

4. A composition according to claim 1, wherein the salt is a betaine.

5. A composition according to claim 1, wherein the salt is a betaine of the formula:

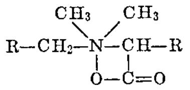

where one R is a long chain aliphatic hydrocarbon radical of 8–18 carbon atoms and the other R is hydrogen.

6. A composition according to claim 1, wherein the salt is a pyridinium salt.

7. A ferromagnetic composition according to claim 1, wherein said salt is lauryl pyridinium chloride.

8. A ferromagnetic composition according to claim 1, wherein said salt is lauryl benzyl pyridinium chloride.

9. A ferromagnetic composition according to claim 1, wherein said salt is diethyl cyclohexyl ammonium lauryl sulfate.

References Cited

UNITED STATES PATENTS 3,490,945 1/1970 Slovinsky ........... 117—235

TOBIAS E. LEVOW, Primary Examiner

A. P. DEMERS, Assistant Examiner

U.S. Cl. X.R.

117—235

PO-1050
(5/69)

UNITED STATES PATENT OFFICE
CERTIFICATE OF CORRECTION

Patent No. 3,634,252 Dated January 11, 1972

Inventor(s) Boynton Graham

It is certified that error appears in the above-identified patent and that said Letters Patent are hereby corrected as shown below:

Column 6, line 62, after "aging" insert --at--.

Column 7, line 23, after "saturation" delete "of".

Column 8, line 63, "Examples XXXIV-XXXVI and control Item H were" should read --Examples X-XXIX and control Item F all employed--.

Column 8, line 64, "$H_{cf}$" should read --$H_{ci}$--.

Column 9, line 20, in Example XXVII of Table 3, "$C_{14}$" should read --$C_{12}$--.

Column 9, before line 50, insert missing heading --EXAMPLES XXXIV-XXXVI--.

Column 10, line 16, "507" should read --50%--.

Signed and sealed this 8th day of August 1972.

(SEAL)
Attest:

EDWARD M.FLETCHER,JR.
Attesting Officer

ROBERT GOTTSCHALK
Commissioner of Patents